(12) United States Patent
Häkkinen et al.

(10) Patent No.: US 6,226,320 B1
(45) Date of Patent: May 1, 2001

(54) METHOD AND EQUIPMENT FOR MULTIRATE CODING AND DETECTION IN A MULTIPLE ACCESS MOBILE COMMUNICATION SYSTEM

(75) Inventors: Hannu Häkkinen, Espoo; Kari Rikkinen; Kari Pehkonen, both of Oulu, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/952,059

(22) PCT Filed: May 7, 1996

(86) PCT No.: PCT/FI96/00255

§ 371 Date: Nov. 7, 1997

§ 102(e) Date: Nov. 7, 1997

(87) PCT Pub. No.: WO96/36132

PCT Pub. Date: Nov. 14, 1996

(30) Foreign Application Priority Data

May 8, 1995 (FI) ........................................ 952211

(51) Int. Cl.⁷ .................................................. H04B 17/00
(52) U.S. Cl. .......................... 375/225; 375/132; 375/140
(58) Field of Search ..................... 375/200, 202, 375/206, 208, 219, 295, 340, 225, 132, 140; 370/209, 320, 342, 468; 380/28, 34

(56) References Cited

U.S. PATENT DOCUMENTS

| | | |
|---|---|---|
| 5,204,876 | 4/1993 | Bruckert et al. . |
| 5,208,804 | 5/1993 | Wilson et al. . |
| 5,341,396 | 8/1994 | Higgins et al. . |
| 5,365,543 * | 11/1994 | Takahashi et al. ............... 375/206 |
| 5,442,625 * | 8/1995 | Gitlin et al. ...................... 370/342 |
| 5,442,629 * | 8/1995 | Geyer et al. ...................... 370/252 |
| 5,504,776 | 4/1996 | Yamaura et al. . |
| 5,802,105 * | 9/1998 | Tiedemann, Jr. et al. ......... 375/225 |

FOREIGN PATENT DOCUMENTS

| | | |
|---|---|---|
| 2 127 606 | 1/1995 | (CA) . |
| 943 410 | 9/1994 | (FI) . |

OTHER PUBLICATIONS

Introduction to CDMA and the CAI= An Overview of the Application of Code Division Multiple Access (CDMA) to Digital Cellular Systems and Personal Cellular Networks, May 21, 1992—pp 1–58.

* cited by examiner

Primary Examiner—Stephen Chin
Assistant Examiner—Chieh M. Fan
(74) Attorney, Agent, or Firm—Pillsbury Winthrop LLP

(57) ABSTRACT

In a communication system in which data and user information are transmitted on a radio path between a transmitting end and a receiving end, multirate coding and detection are carried out by: allocating different signal waveforms to different transfer rates, selecting, at the transmitting end, the data transfer rate to be used on the radio path for transferring user information, selecting, at the transmitting end, the signal waveform to be used on the radio path according to the selected transfer rate, transmitting the user information with the selected transfer rate and the selected signal waveform to the receiving end, the signal waveform indicating the selected data transfer rate, detecting, at the receiving end, the signal waveform used on the radio path, selecting, at the receiving end, a transfer rate corresponding with the detected signal waveform, and adapting reception to the selected transfer rate.

15 Claims, 4 Drawing Sheets

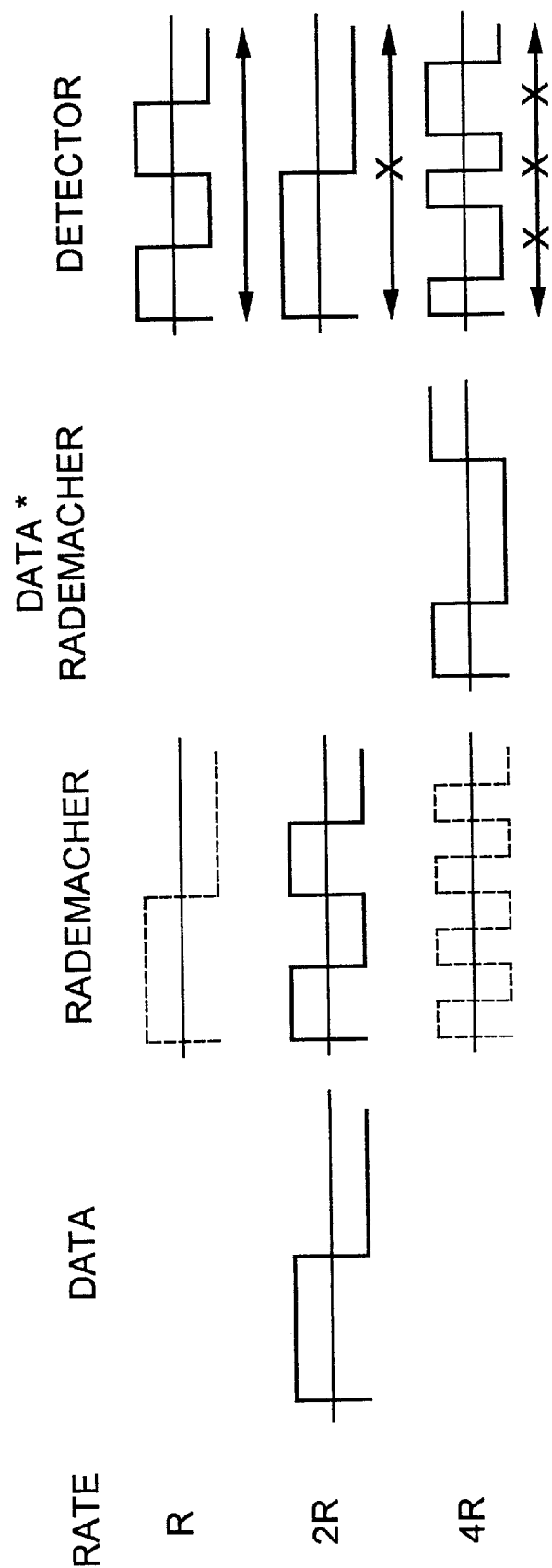

METHOD AND EQUIPMENT FOR MULTIRATE CODING AND DETECTION IN A MULTIPLE ACCESS MOBILE COMMUNICATION SYSTEM

This application is the national phase of international application PCT/FI96/00255, filed May 7, 1996 which designated the U.S.

FIELD OF THE INVENTION

The present invention relates to multirate coding and detection in a multiple access mobile communication system in which a transmitter selects the data transfer rate, and forwards information on the selected data transfer rate to a receiver which adapts reception to the selected rate.

BACKGROUND OF THE INVENTION

In present-day digital mobile communication systems, user information, i.e. speech and data, are transferred over the radio interface in digital form. In some cases, it is possible to select out of many transfer rates the one which is best suited to a speech coding rate used and to data transfer requirements of the user. The transfer rate is typically chosen at the beginning of a call and maintained unchanged for the duration of the call. In mobile communication systems to come, more flexibility is required at the radio interface for embodying various kinds of services. One of the consequences of this requirement for flexibility is a rapidly varying transfer rate during a call. In a digital mobile communication system, for example, in which user information is packed into transmission frames (10 ms of duration, for example), each frame may have a transfer rate independent of the previous or the subsequent transfer frame. However, a problem emerges in how to transfer information on the current transfer rate as quickly as possibly from the transmitter to the receiver in order for the receiver to be able to adapt its operation to the transfer rate being used. In addition, in interference limited mobile communication systems such as spread spectrum radio systems, it is advantageous to employ a fast closed loop power control. By means of power control, a base stations seeks to adjust the transmit power of mobile stations so that all the signals transmitted by the mobile stations are received by the base station at the same nominal power level. In other words, by means of power control, the aim is to average the energy of a symbol transmitted over the radio path, and therefore the transmit power is also proportional to rate. Due to this, when employing closed loop power control, the receiver needs to know the current transfer rate without delay.

A known solution is to employ on the radio path a separate signalling channel through which information on the transfer rate is conveyed from the transmitter to the receiver. The closed loop power control can be carried out with such a signalling channel. Separate signalling, however, causes delay in the practical implementation. The message indicating transfer rate is protected against interference and interleaved in the transmitter. The most efficient interleaving lasts for the length of the transfer frame. Prior to knowing the transfer rate and completing the user signal processing, deinterleaving and error correction are carried out in the receiver. As a consequence the received user signal has to be buffered until these reception operations are completed. A further consequence is that activating the closed loop power control is delayed. If the receiver of a spread spectrum system utilizes interference cancellation (IC) or multiuser detection (MUD), the delay caused by detecting the transfer rate employed also concerns the interfering signals (other users). In an asynchronous spread spectrum mobile communication system, the propagation delay, with the above assumptions, will be twice the interleaving depth+signal processing delay.

DISCLOSURE OF THE INVENTION

It is an object of the present invention to provide a system and an apparatus by means of which a receiver of a mobile communication system is able to detect, with a reasonable delay and an economical receiver construction, the transfer rate employed by a transmitter at any one time.

This is achieved with a method comprising the steps of selecting, at the transmitting end, the data transfer rate to be used on the radio path for transferring user information; forwarding information on the current transfer rate to the receiving end; adapting reception to the transfer rate employed. The method of the invention is characterized by allocating different signal waveforms to different transfer rates; selecting, at the transmitting end, the signal waveform to be used on the radio path according to the selected transfer rate; detecting, at the receiving end, the signal waveform used on the radio path; selecting, at the receiving end, a transfer rate corresponding with the detected signal waveform.

The invention also relates to an equipment for multirate coding in a transmitter of a multiple access mobile communication system, which transmitter sends user information to the radio path with a varying transfer rate. The equipment of the invention is characterized in that the transmitter is arranged to allocate different signal waveforms to different transfer rates, and the equipment is arranged to convey a data transfer rate information to the receiving end by using a signal waveform allocated to the transfer rate on the radio path.

In addition, the invention relates to an equipment for detecting a varying transfer rate in a receiver of a multiple access mobile communication system, the receiver receiving user information from the radio path with a varying transfer rate. The equipment of the invention is characterized in that the receiver is arranged to allocate different signal waveforms to different transfer rates, and that the equipment comprises a detector which detects the transfer rate used at the transmitting end on the basis of the received signal waveform.

According to the invention the varying transfer rate is coded at the transmitting end by using a signal waveform which is selected according to the transfer rate employed at any one time. At the reception end, the waveform of the received signal is recognized, and, consequently, the transfer rate employed by the transmitter will be recognized. For example, in a mobile communication system utilizing frequency hopping (FH) or time hopping (TH), the hopping pattern may be selected in the transmitter according to the transfer rate. In a multi-carrier HFDMA system the carrier waves used, or combinations thereof, may be selected according to the transfer rate. In a CDMA system, the spreading code may be selected according to the transfer rate. In addition, these methods can be combined.

In other words, methods similar to those being used to distinguish different users from one another are employed for the recognition of the transfer rates of different users. It is characteristic for the aforementioned multiple access methods that there is a higher number of proper spreading waveforms available than the number of simultaneous users allowed by the interference limitations of the mobile communication system. Due to the above, the mobile communication system has extra "channels" available by means of which the "multiple access" can be extended to cover transfer rate as well. However, it must be noted that the multiple access methods and waveforms employed for recognizing the users in a mobile communication system from one another may be based on a different method than the transfer rate coding according to the present invention in the same system.

One of such methods differing from the multiple access methods is to shape the user information with Rademacher waveforms or similar waveforms that have adequate cross correlation characteristics. This is an economical method as far as the implementation of a receiver, particularly in a CDMA mobile communication system, is concerned.

As the different transfer rates are identified according to the invention by means of different signal waveforms, the signal waveforms and, consequently, the transfer rate can be detected in the receiver after reception of only a few symbols (speech or data). The detection of a user signal can thus be started in the receiver after a relatively short delay without having to wait, e.g., for the end of the frame and deinterleaving. As a result, it is possible to activate closed loop power control and multiple access interference cancellation of, for example, spread spectrum systems from almost the very beginning of a frame. At first, in the beginning of the frame the most probable transfer rate may be estimated by following the maximum principle, for example, until it is possible to make a reliable final decision on the transfer rate.

BRIEF DESCRIPTION OF THE DRAWINGS

In the following, the invention will be described in closer detail by means of the preferred embodiments with reference to the accompanying drawings, in which FIGS. 5A, 5B, 5C and 5D show a signal chart illustrating the operation of the transmitter of FIG. 3 and the receiver of FIG. 4.

PREFERRED EMBODIMENTS OF THE INVENTION

Figure 1:
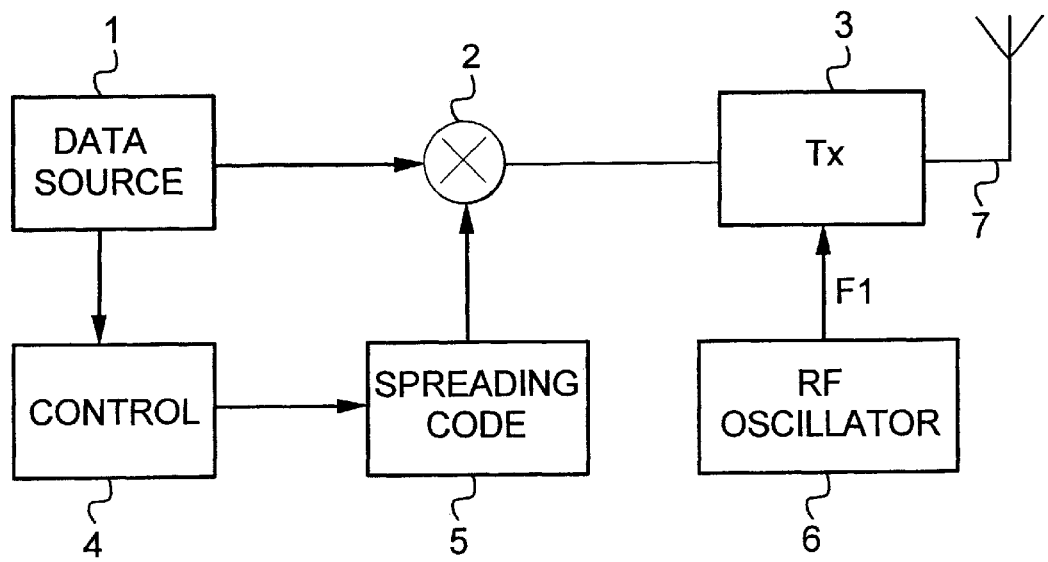
FIG. 1 is a block diagram of a CDMA transmitter in which the spreading code is selected on the basis of the transfer rate.

As noted in the above, the basic idea of the invention is to code the varying transfer rate of user information (speech or data) in the transmitter by using a spreading waveform which is selected according to the transfer rate being employed at any one time. In the receiver, it is detected at which spreading waveform the signal is present, and the transfer rate used will be identified accordingly. Multiple access methods enable a simultaneous access for a multitude of users to the frequency spectrum with minimum disturbance to one another. In a frequency division multiple access method (FDMA), each user has a dedicated frequency channel, which is a relatively narrow frequency band on which the transmit power of the user's signals is concentrated. In a time division multiple access method (TDMA), the channel consists of a time slot within a sequence of several time slots forming a frame. The energy of a user's signal is limited to one of these time slots. Some mobile communication systems employ a combination of FDMA and TDMA methods.

FDMA, TDMA or FDMA/TDMA mobile communication systems may employ frequency hopping (FH) or time hopping (TH) to spread a user's signal in frequency or time domain. Frequency hopping utilizes a wider spectrum by changing the carrier frequency (frequency channel) of the transmit signal sequentially. Correspondingly, the time hopping method changes the time slot (channel) of the transmit signal sequentially. This channel changing is referred to as "hopping", and the channels and their sequence within one hopping cycle as a hopping pattern.

Frequency or time hopping can be employed in the transmitter to code the transfer rate according to the invention. In this embodiment different time or frequency hopping patterns are allocated to different transfer rates, which can be selected during a call. Mapping (determined co-dependence) between the hopping patterns and transfer rates is known by both the transmitter and the receiver. The hopping pattern used at any one time is selected in the transmitter according to the transfer rate. In the receiver, it is detected at which hopping pattern the signal is present, and on the basis of the detected hopping pattern a respective transfer rate is identified. Following this, the received user signal is detected and further processed by using said identified transfer rate.

In a multi-carrier system (orthogonal FDMA), carrier waves or their combinations used by the transmitter at any one time are selected according to the transfer rate. Mapping between different transfer rates and carriers, or their combinations, is known by both the transmitter and the receiver. The receiver detects at which carrier waves or their combinations the signal is present and on the basis of this identifies the transfer rate. Following this, the receiver detects and processes the user signal further at this transfer rate.

In a code division multiple access (CDMA) system, each user is provided with a dedicated pseudo-random binary sequence, which is referred to as a spreading sequence. The user signal and carrier are modulated by the spreading sequence, resulting in a spread spectrum of the modulated waveform. This means that a plurality of CDMA signals can share the same frequency spectrum. These signals are identified in the receiver by using a correlator which combines the energy of a specific binary sequence and reproduces its original spectrum. The invention is applicable to coding a transfer rate in a CDMA mobile communication system by selecting the spreading code in the transmitter according to the transfer rate.

The methods disclosed above may also be combined. In other words, the different transfer rates of individual users can be distinguished from one another by means of methods similar to those being used to distinguish different users from one another. The multiple access methods described above are characterized in that there is a higher number of proper spreading waveforms available than the interference limitations of the system allow there to be simultaneous users. By means of these "extra" spreading waveforms, the "multiple access" can be extended to cover different transfer rates of one subscriber also. However, it must be noted that this does not exclude the alternative that the actual multiple access is provided in the mobile communication system with a different method than the transfer rate coding according to the present invention. An example of such an alternative will be described below in connection with FIGS. 3, 4 and 5.

In the following, the preferred embodiments of the present invention will be described in connection with a CDMA system, to which the invention can especially well be applied. The CDMA principle will only be described to the extent necessary for illustration of the invention. For a more detailed description of CDMA, the document "An overview of the application of code division multiple access (CDMA) to digital cellular systems and personal cellular networks", QUALCOMM Incorporated, May 21, 1992, USA is referred to.

FIG. 1 is block diagram illustrating the principle of a CDMA transmitter in which a spreading code is selected according to the transfer rate being used at any one time. In accordance with the normal principle of a CDMA transmitter, the user signal 1, i.e. speech or data, obtained from a data source 1 is mixed with a spreading code from a spreading code generator 5, in a mixer 2. The spreading code spreads the user signal, producing a spread spectrum signal which is modulated in a transmitter 3 to a carrier frequency F1, generated by an oscillator 6, and which is transmitted to the radio path via an antenna 7. The user signal transfer rate of the data source 1 may vary rapidly during a call, obtaining two or more different values. According to the invention, a dedicated spreading code is allocated to each of the different transfer rates. Information on the mapping between the allowed transfer rates and the corresponding spreading codes is stored in a control unit 4. During transmission, the control unit 4 selects, according to the transfer rate employed by the data source, a corresponding spreading code which the spreading code generator 5 generates for the mixer 2. Thus, the transmitter of FIG. 1 transmits to the radio path a spread spectrum signal whose spreading waveform depends on the transfer rate.

Figure 2:
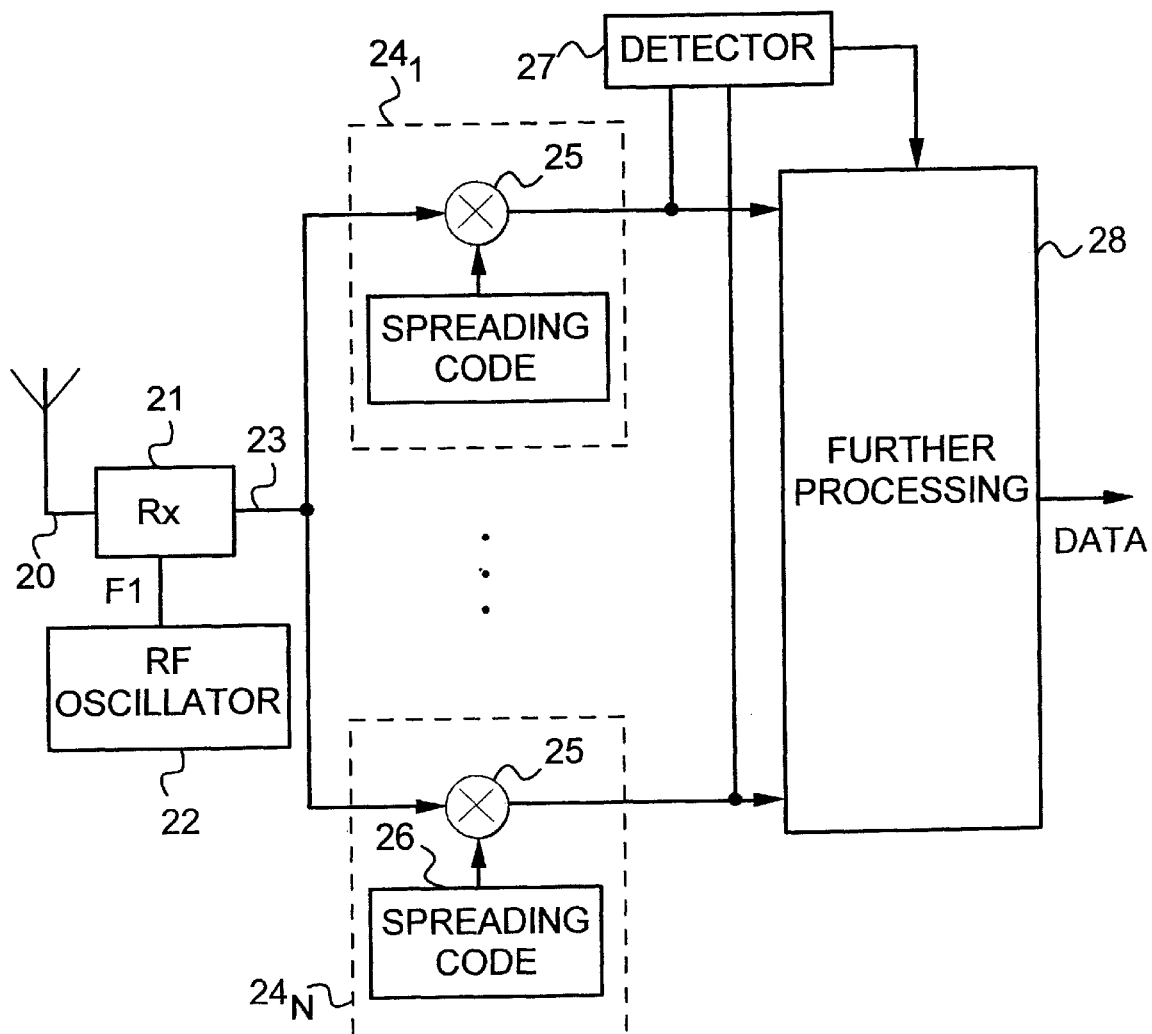
FIG. 2 is a block diagram of a CDMA receiver in which the transfer rate coded by the transmitter of FIG. 1 is detected on the basis of the spreading code.

FIG. 2 shows a block diagram illustrating the principle of a CDMA receiver in which the transfer rate can be detected according to the spreading waveform of the received spread spectrum signal. The spread spectrum signal received at an antenna 20 is demodulated in a receiver 21 to a baseband frequency by means of the carrier frequency F1 generated by an RF oscillator 22. The baseband spread spectrum signal 23 is fed to correlators $24_1 \ldots 24_N$. This embodiment of the invention comprises a separate correlator 24 for every allowed spreading code. For example, if the number N of allowed transfer rates is 3, the number N of spreading codes and correlators 24 is 3 as well. Each correlator $24_1 \ldots 24_N$ comprises a mixer 25 and a spreading code generator 26. The mixer 25 mixes the signal 23 with the spreading code whereby the user signal is available at the output of that correlator 24 whose spreading code corresponds with the spreading code employed by the transmitter. At the outputs of the other correlators 24, only noise is present. A detector 27, for example a signal output level detector, detects which detector 24 has the user signal at its output. In the detector 27 there is information stored on the mapping between the spreading codes and transfer rates employed by the transmitter as well as the spreading codes of the correlator $24_1 \ldots 24_N$. On the basis of these pieces of information, the detector 27 identifies the transfer rate employed by the transmitter and provides a further processing unit 28 with information on which transfer rate and the output signal of which correlator 24 the further processing unit is to use. For example, if the transmitter employs a spreading code 1, the user signal is present at the output of the correlator $24_1$, whereby the detector 27 controls the further processing unit 28 to process the output signal of the correlator $24_1$, and to use a transfer rate corresponding with the spreading code 1. As far as the invention is concerned, the functions determined for the further processing unit 28 are not essential. Such functions may include, for example, deinterleaving, channel decoding, error correction, etc. Generally speaking, further processing 28 may be understood to refer to all the receiver circuits and functions which require an actual user signal or information on the transfer rate being used. Other functions like this may, for example, include closed loop power control and multiple access interference cancellation.

The user signal is present at the output of the correct correlator $24_1 \ldots 24_N$ after reception of only a few symbols, which means that the transfer rate can be detected immediately. Hence, it is possible to start detecting the user signal after a relatively short delay, compared to using a separate signalling channel. If necessary, it is possible to employ buffering at the input of the further processing unit 28 to compensate the delay required for the detection of the transfer rate.

Figure 3:
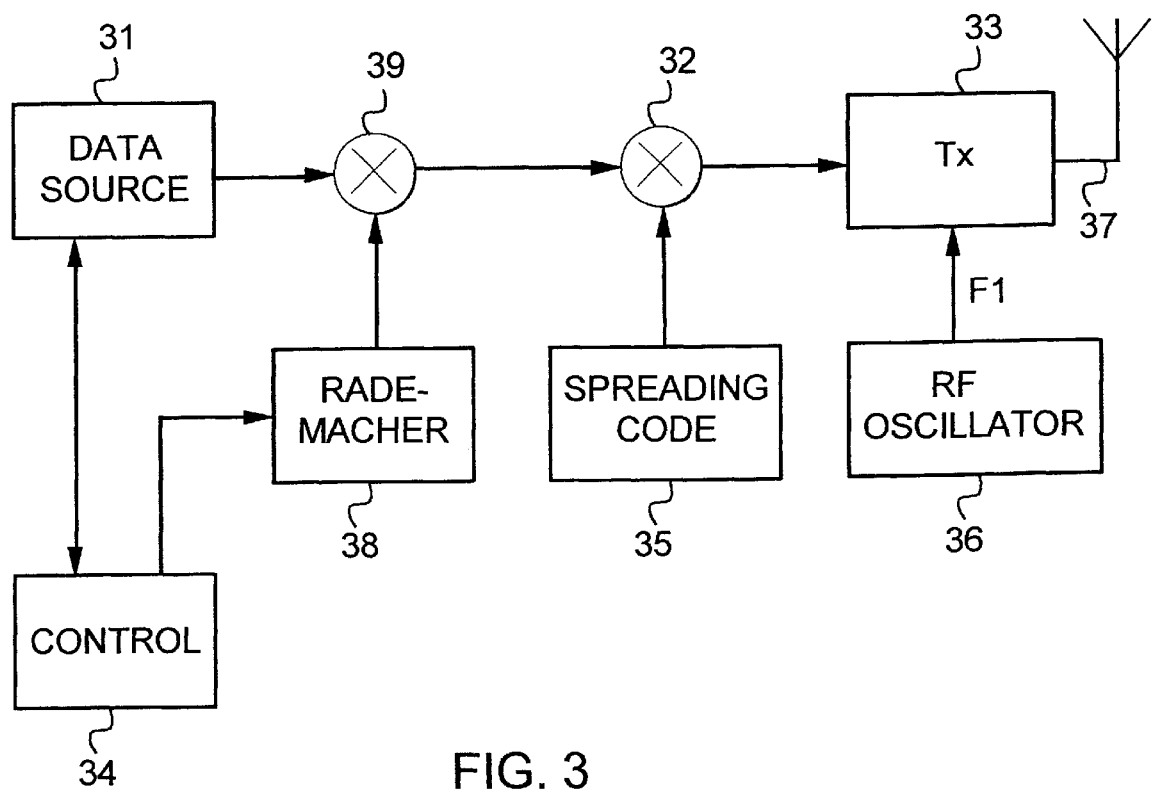
FIG. 3 is a block diagram of a CDMA transmitter in which a transfer rate is coded by shaping a user data code with Rademacher waveforms.
Figure 4:
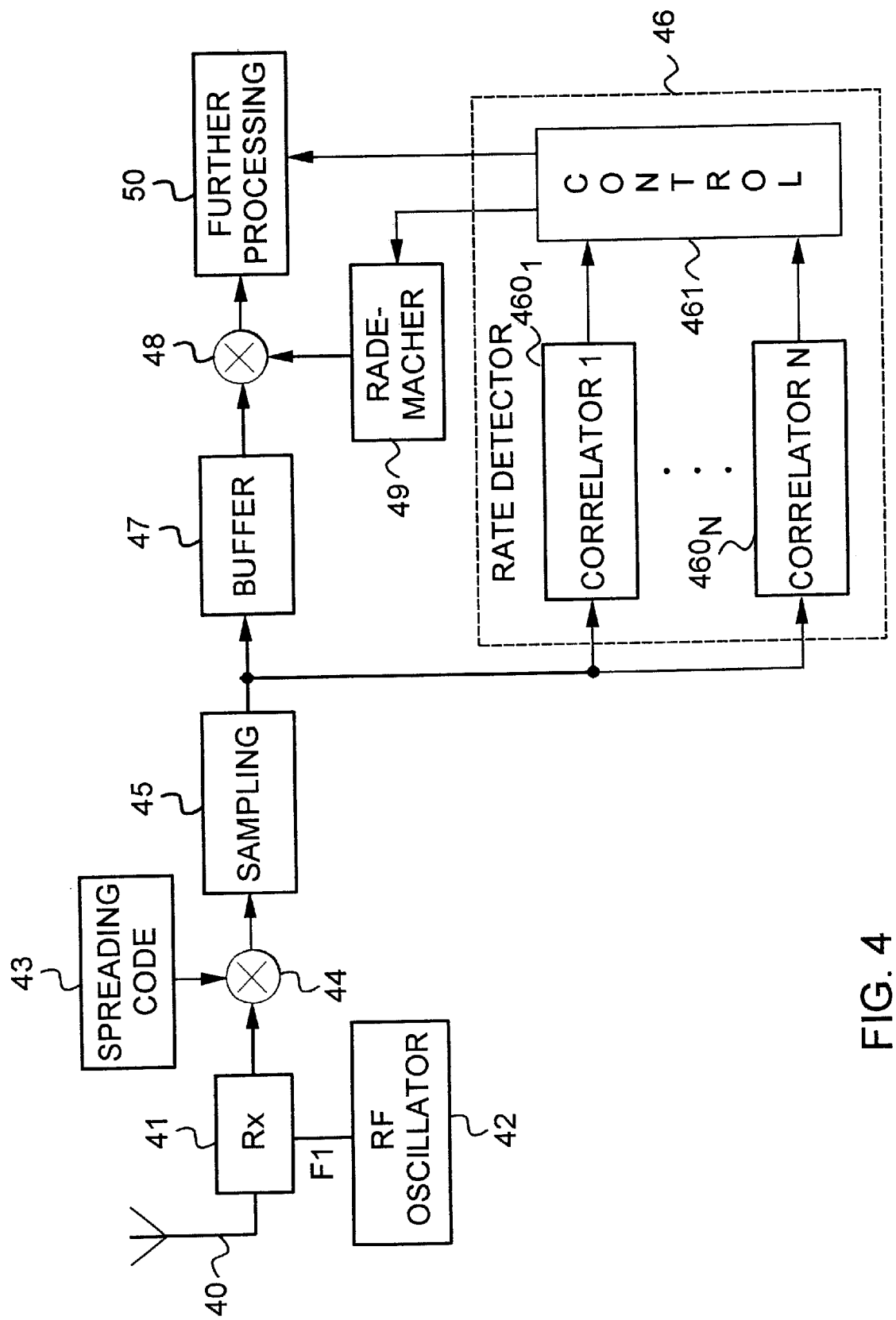
FIG. 4 is a block diagram of a CDMA receiver which detects the transfer rate coded in FIG. 3 on the basis of the Rademacher waveform.

FIGS. 3, 4 and 5 describe the second embodiment of the invention, by which a simpler and more economical implementation of a receiver can be achieved in a CDMA system. In the transmitter of FIG. 3, the user signal is fed from a data source 31 to a multiplier 39, in which it is multiplied by a Rademacher waveform generated by a Rademacher generator 38. The user signal modified at the multiplier 39 is applied to a mixer 32 in which its spectrum is spread by a spreading code generated by a spreading code generator 35. A spread spectrum signal thus provided is modulated in a transmitter 33 to a carrier frequency F1 generated by an RF oscillator 36, and transmitted to the radio path via an antenna 37. The transfer rate of the user signal from the data source 31 may be changed rapidly during a call. In this example, the transfer rates allowed for a user signal are 1R, 2R, 4R ..., R being the basic transfer rate. To every allowed transfer rate, a dedicated Rademacher waveform is allocated for shaping the user signal in the multiplier 39. In the preferred embodiment of the invention, a Rademacher waveform having a frequency twice the respective transfer rate is allocated to each transfer rate. Information on the mapping between the transfer rates and the Rademacher waveforms is maintained by a control unit 34. The control unit 34 monitors the transfer rate of the data source 31, and when the transfer rate changes the unit causes the Rademacher generator 38 to produce a Rademacher waveform allocated to the new transfer rate. As a result, the transmitter sends a spread spectrum signal to the radio path, the Rademacher waveform of the signal indicating the transfer rate employed.

Referring to FIG. 4, a radio frequency signal received by an antenna 40 is demodulated to baseband in a reception unit 41 by an oscillator signal F1 from a local oscillator 42. The baseband spread spectrum signal is applied to a mixer 44 in which the spreading code is mixed with a spreading code generated by a generator 43, whereby the resulting output signal will be the user signal originally transmitted and processed with a Rademacher waveform. In a sampling unit 45, the output signal of the mixer 44 is sampled at a sampling rate which is twice the highest allowed transfer rate (i.e. of the frequency of the Rademacher waveform). The half symbols having the highest transfer rate are outputted by the sampling unit 45 to a rate detector 46 and a buffer memory 47. In the buffer memory 47 the half symbols are buffered until the rate detection is completed. In the detector 46, the transfer rate is detected by restoring the symbols corresponding with the allowed transfer rates. This takes place by correlating the half symbols received from the sampling unit 45 in correlators 460₁–460ₙ. The number N of correlators corresponds with the number of different transfer rates and Rademacher waveforms. In a correlator 1, the samples are correlated with the first Rademacher waveform. As a result, the symbols corresponding with the respective transfer rate are restored. The power of the symbols is integrated over a long enough time period. A similar procedure is carried out for each of the other Rademacher waveforms in the respective other correlators 460. Due to the orthogonal characteristics of the Rademacher waveforms, only the correlator 460 corresponding with the transfer rate and Rademacher code employed by the transmitter provides an integration result deviating from zero. The integration result of the other correlators is zero as a response to the user signal. In addition, the integration results contain interference and noise components, which are filtered to the extent required. The outputs of the correlators 460₁–460ₙ are inputted to a control unit 461 which will identify the correlator which provides the highest integration result. Mapping between different transfer rates and the Rademacher waveforms, used by the transmitter, is stored in the memory of the control unit 461. The control unit 460 provides information on the correct Rademacher code to the Rademacher generator 49, and information on the transfer rate to a further processing unit 50. Now, the half symbols buffered in the buffer memory 47 during the rate detection are applied to a multiplier 48. In the multiplier 48 the half symbols are multiplied by a Rademacher waveform generated by the Rademacher generator 49. As a result, the original user signal (speech or data) is fed from the multiplier 48 to the further processing unit 50. The further processing unit 50 may contain similar functions as the further processing unit 28 of the receiver in FIG. 2.

Although FIGS. 3 and 4 show the shaping with a Rademacher code prior to the processing with a spreading code, the processing with a Rademacher code may be carried out following the processing with a spreading code, or it may take place simultaneously, i.e. the spreading code and the Rademacher code are mixed together prior to processing the actual signal with the resulting combinatory code.

FIGS. 5A–5D illustrate different signal waveforms in the transmitter of FIG. 3 and the receiver of FIG. 4 with a transfer rate of 2R. FIG. 5A illustrates a data signal having a transfer rate of 2R. FIG. 5B illustrates a Rademacher waveform allocated to the transfer rate 2R, the waveform, having the frequency 2*2R. In addition, the dotted lines in FIG. 5B illustrate Rademacher waveforms allocated to transfer rates R and 4R. At output of the multiplier 39, a modified waveform according to FIG. 5C is obtained. This waveform is further spread, modulated and transmitted through the radio channel to a receiver wherein the spreading is removed in a mixer 44. The output signal of the mixer 44 is shown in FIG. 5C. The half symbols at the highest data rate produced from the output waveform of the mixer 44 in the sampling unit 45 are applied to the correlators in which the samples are correlated with different Rademacher waveforms. The correlation results are illustrated in FIG. 5D. The correlation result of the samples and the Rademacher waveform allocated to the transfer rate R are shown at the top of FIG. 5D. The correlation depth, i.e. the symbol length, is 1/R. If the correlation result is integrated over this correlation depth, the correlation result obtained will be zero, which indicates that the transfer rate employed is not R. The bottom part of FIG. 5D shows the correlation between the samples and a Rademacher waveform allocated to a transfer rate of 4R. If the correlation result is integrated over the correlation depth, i.e. the symbol length $C_L=1/4R$, the result is again zero, and thus the deduction can be made that the transfer rate is not 4R. The intermediate part of FIG. 5D shows the correlation between the samples and a Rademacher waveform allocated to a transfer rate of 2R. If this correlation result is integrated over the correlation depth $C_L=1/2R$, a result deviating from zero will be obtained, which indicates that the transfer rate employed is 2R.

An advantage of the Rademacher waveforms employed in the example is a complete orthogonality between different transfer rates, and a computationally advantageous detection method, because the initial data for all the correlators are common half symbols corresponding with the highest transfer rate. Rademacher waveforms are illustrated, for example, in the publications "Walsh Function and Their Applications", Beauchamp, K. G., New York, N.Y., Academic Press Inc., 1975. 236p. and "Digital Communications", Proakis, J. G., Second Edition, New York, McGraw-Hill Book Company, 1989, 186p.

However, it should be noted that although the invention is in the above described by means of Rademacher waveforms, the invention is applicable with several different waveforms that have adequate cross correlation characteristics.

Although the invention is described with reference to specific embodiments, it should be understood that the description is exemplary only, and changes and modifications thereto are possible without departing from the scope and spirit of the invention defined in the attached claims.

What is claimed is:

1. A method for multi-rate coding and detecting in a communication system in which data and user information are transmitted on a radio path between a transmitting end and a receiving end, the method comprising:

allocating different signal waveforms to different transfer rates;

selecting, at the transmitting end, a data transfer rate to be used on the radio path for transferring the user information;

selecting, at the transmitting end, a signal waveform to be used on the radio path according to the selected data transfer rate;

transmitting the user information with the selected transfer rate and the selected signal waveform to the receiving end, said signal waveform indicating the selected data transfer rate;

detecting, at the receiving end, the signal waveform used on the radio path;

selecting, at the receiving end, a transfer rate corresponding with the detected signal waveform; and adapting reception to the selected transfer rate.

2. A method for multi-rate coding and detecting in a time or frequency division multiple access mobile communication system in which data and user information are transmitted on a radio path between a transmitting end and a receiving end, the method comprising:

allocating different time or frequency hopping patterns to different transfer rates;

selecting, at the transmitting end, a data transfer rate to be used on the radio path for transferring the user information;

selecting, at the transmitting end, a frequency hopping pattern to be used on the radio path according to the selected data transfer rate;

transmitting the user information with the selected transfer rate and the selected frequency hopping pattern to the receiving end, said frequency hopping pattern indicating the selected data transfer rate;

detecting, at the receiving end, at which of the hopping patterns a signal is present; and selecting, at the receiving end, a transfer rate corresponding with the detected frequency hopping pattern for further processing of the signal.

3. A method for multi-rate coding and detecting in a multi-carrier mobile communication system in which data and user information are transmitted on a radio path between a transmitting end and a receiving end, the method comprising:

allocating different carriers or combinations of the different carriers to different transfer rates;

selecting, at the transmitting end, a data transfer rate to be used on the radio path for transferring the user information;

selecting, at the transmitting end, the different carriers or the combinations of the different carriers to be used on the radio path according to the selected transfer rate;

transmitting the user information with the selected transfer rate and on the selected different carriers or the combinations of the different carriers to the receiving end, said different carriers or the combinations of the different carriers indicating the selected data transfer rate;

detecting, at the receiving end, at which carrier waves or combinations of the carrier waves a signal is present; and selecting, at the receiving end, a transfer rate corresponding with the detected carrier waves or the combinations of the detected carrier waves for further processing.

4. A method for multi-rate coding and detecting in a code division multiple access method in which data and user information are transmitted on a radio path between a transmitting end and a receiving end, the method comprising:

allocating different spreading codes to different transfer rates;

selecting, at the transmitting end, a data transfer rate to be used on the radio path for transferring the user information;

selecting, at the transmitting end, a spreading code to be used on the radio path according to the selected data transfer rate;

transmitting the user information with the selected data transfer rate and on the selected spreading code to the receiving end, said spreading code indicating the selected data transfer rate;

detecting, at the receiving end, at which of the spreading codes a signal is present; and selecting, at the receiving end, a data transfer rate corresponding with the detected one of the spreading codes for further processing of the signal.

5. A method for multi-rate coding and detecting in a code division multiple access method in which a user signal is transmitted on a radio path between a transmitting end and a receiving end, the method comprising:

allocating different shaping waveforms to different transfer rates;

selecting, at the transmitting end, a data transfer rate to be used on the radio path for transferring the user signal;

shaping the user signal with a shaping waveform which is selected according to the selected transfer rate;

spreading, at the transmitting end, the shaped user signal with a spreading code;

reproducing, at the receiving end, the shaped user signal by means of the spreading code;

detecting which of the shaping waveforms the user signal has been shaped with; and selecting a transfer rate corresponding with the detected shaping waveform for further processing of he user signal.

6. A method as claimed in claim 5, wherein the shaping waveform is a Rademacher waveform.

7. A transmitter for multi-rate coding in a code division multiple access mobile communication system, said transmitter being arranged to send user information on a radio path with a varying transfer rate, said transmitter comprising:

means for allocating different spreading codes to different transfer rates; and means for conveying data transfer rate information to a receiving end by using a spreading code allocated to a transfer rate on the radio path.

8. A transmitter for multi-rate coding in a code division multiple access mobile communication system, comprising:

means for allocating different shaping waveforms to different transfer rates;

means for conveying data transfer rate information to a receiving end by using a signal waveform allocated to a transfer rate on a radio path;

means for providing a given spreading code;

means for allocating the different shaping waveforms and the given spreading code to the different transfer rates in the transmitter;

means for providing user information; and a signal shaper for shaping the user information with a shaping waveform allocated to the transfer rate.

9. A receiver of a code division multiple access mobile communication system, said receiver being arranged to receive a signal containing user information transmitted from a transmitting end over a radio path with a varying transfer rate, said receiver comprising:

means for detecting the varying transfer rate; and means for allocating different spreading codes to different transfer rates, wherein said means for detecting the varying transfer rate comprises a detector which detects a transfer rate used at the transmitting end based on a received one of the spreading codes.

10. A code division multiple access mobile communication system, comprising:

a transmitter; and a receiver, wherein said transmitter comprises:

means for transmitting, on a radio path and at a selected transfer rate, a spread spectrum signal formed by mixing user information with a spreading code;

means for allocating different shaping waveforms and a given spreading code to different transfer rates; and means for conveying data transfer rate information identifying the selected transfer rate to the receiver by using a signal waveform allocated to the selected transfer rate on the radio path, wherein said receiver comprises a signal shaper to shape the user information with a shaping waveform allocated to the selected transfer rate.

11. A system as claimed in claim 10, wherein each of the transfer rates has allocated thereto a Rademacher waveform which has a frequency twice as high as a corresponding transfer rate, and said receiver further comprises:

a mixer arranged to multiply the received spread spectrum signal by the spreading code to produce a mixer output signal;

a sampling unit arranged to sample the mixer output signal at a sampling frequency which is at least twice a highest transfer rate allowed for the user information;

a buffer arranged to buffer said sampled mixer output signal for a duration of transfer rate detection; and a transfer rate detector arranged to correlate said sample mixer output signal with each of the Rademacher waveforms, arranged to integrate each correlation result over an integration period which has a length of at least one symbol at a respective transfer rate, and arranged to select a transfer rate which corresponds with the Rademacher waveform having a correlation result deviating from zero as the transfer rate of the receiver.

12. A transmitter for multi-rate coding in a code division multiple access mobile communication system, said transmitter being arranged to send user information on a radio path with a varying transfer rate, said transmitter comprising:

a spreading code allocating mechanism to allocate different spreading codes to different transfer rates: and a data transfer rate conveying mechanism to convey data transfer rate information to a receiving end by using a spreading code allocated to a transfer rate on the radio path.

13. A transmitter for multi-rate coding in a code division multiple access mobile communication system, comprising:

a shaping waveform allocating mechanism to allocate different shaping waveforms to different transfer rates;

a data transfer rate conveying mechanism to convey data transfer rate information to a receiving end by using a signal waveform allocated to a transfer rate on a radio path;

a spreading code providing mechanism to provide a given spreading code;

a shaping waveform and spreading code allocating mechanism to allocate the different shaping waveforms and the given spreading code to the different transfer rates in the transmitter;

a user information providing mechanism to provide user information; and a signal shaper to shape the user information with a shaping waveform allocated to the transfer rate.

14. A receiver of a code division multiple access mobile communication system, said receiver being arranged to receive a signal containing user information transmitted from a transmitting end over a radio path with a varying transfer rate, said receiver comprising:

a transfer rate detecting mechanism to detect the varying transfer rate; and a spreading code allocating mechanism to allocate different spreading codes to different transfer rates, wherein said transfer rate detecting mechanism comprises a detector which detects a transfer rate used at the transmitting end based on a received one of the spreading codes.

15. A code division multiple access mobile communication system, comprising:

a transmitter; and a receiver, wherein said transmitter comprises:

a spread spectrum transmitting mechanism to transmit, on a radio path and at a selected transfer rate, a spread spectrum signal formed by mixing user information with a spreading code;

a shaping waveform and spreading code allocating mechanism to allocate different shaping waveforms and a given spreading code to different transfer rates; and a data transfer rate conveying mechanism to convey data transfer rate information identifying the selected transfer rate to the receiver by using a signal waveform allocated to the selected transfer rate on the radio path, wherein said receiver comprises a signal shaper to shape the user information with a shaping waveform allocated to the selected transfer rate.

* * * * *

UNITED STATES PATENT AND TRADEMARK OFFICE
CERTIFICATE OF CORRECTION

PATENT NO. : 6,226,320 B1
DATED : May 1, 2001
INVENTOR(S) : Hakkinen et al.

It is certified that error appears in the above-identified patent and that said Letters Patent is hereby corrected as shown below:

<u>Title page,</u>
Please correct the title pages to read as follows:

-- [73] Assignee: Nokia Telecommunications Oy and Nokia Mobile Phones, Ltd. --

Signed and Sealed this

Twenty-fourth Day of December, 2002

JAMES E. ROGAN
*Director of the United States Patent and Trademark Office*